Patented Sept. 26, 1922.

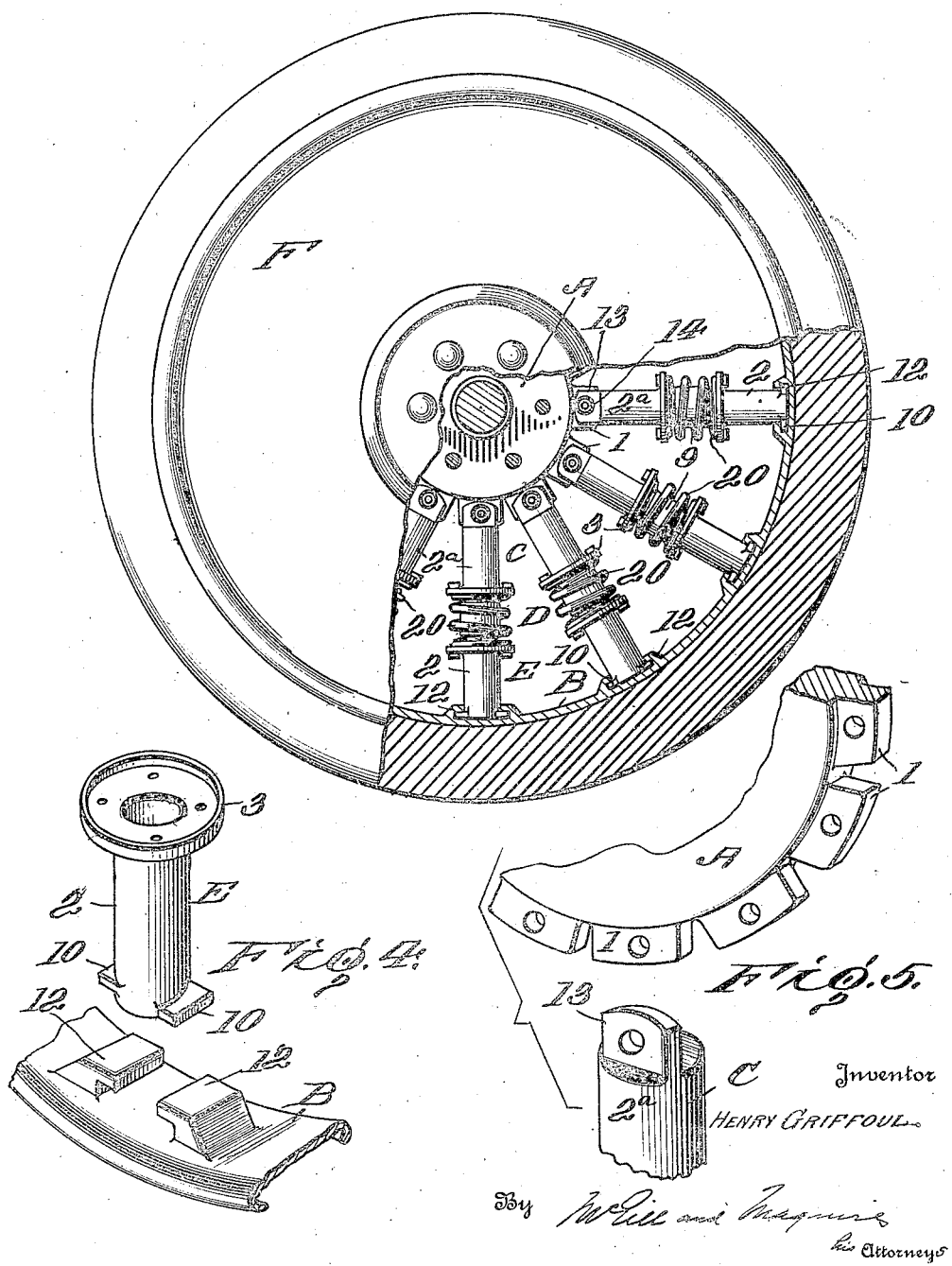

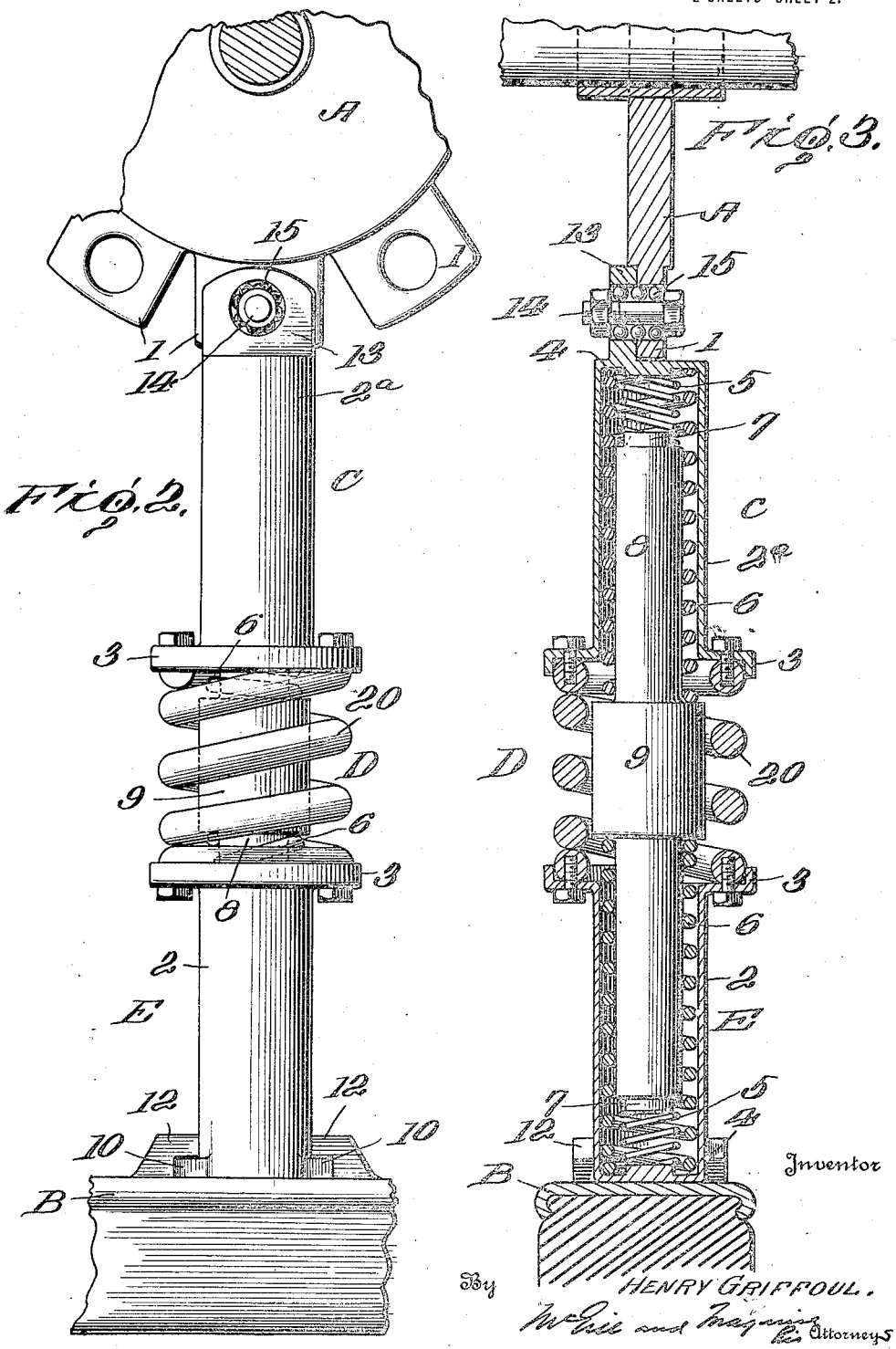

1,430,444

UNITED STATES PATENT OFFICE.

HENRY GRIFFOUL, OF NEW BRIGHTON, PENNSYLVANIA.

SPRING WHEEL.

Application filed February 10, 1921. Serial No. 443,829.

*To all whom it may concern:*

Be it known that I, HENRY GRIFFOUL, of New Brighton, in the county of Beaver and State of Pennsylvania, have invented certain new and useful Improvements in Spring Wheels; and I do hereby declare the following to be a full, clear, and exact description of the invention, such as will enable others skilled in the art to which it appertains to make and use the same.

My invention relates to wheels and especially that type of wheel wherein a resilient connection is made between the hub and felly, and the object of my invention is to produce such a wheel wherein this resilient connecton is a simple arrangement of coiled springs within a pair of tube-like members with a larger spring spacing such members and a guiding shaft having its ends within the tube-like members and its center circumferentially enlarged to form a core for the larger coiled spring.

In the drawings, Figure 1 is an elevation of my improved wheel with a portion of the side plate removed. Figure 2 is an enlarged view showing a portion of the hub, a spoke and a portion of the felly. Figure 3 is a vertical sectional view of the parts shown in Figure 2, at right angles thereto. Figure 4 is a detail showing the connection between the tubes and felly. Figure 5 shows the manner of attaching a tube to the hub.

The hub of the wheel is indicated at A and the felly at B. Projecting radially from the hub are a series of what I term apertured spoke seats 1. For descriptive purposes I specify each spoke as having three main parts, the inner C, central D, and outer E. The inner and outer parts are in many respects similar, and each is formed of a tube 2 (the inner tube being designated 2ª), preferably of steel and closed at one end, and each tube has an annular and radially projecting flange 3. The inner end of each tube is circularly recessed to form a seat 4 for one end of a short and small coiled spring 5 as well as for one end of a slightly larger and longer coiled spring 6. The other end of the spring 5 is seated on the reduced end 7 of a shaft 8 which is part of the central portion D of the spoke, while the spring 6 is coiled about this shaft being seated near the middle of the shaft where the latter is circumferentially enlarged as at 9. Each outer tube has two laterally projecting flanges 10 which form the means by which the tube is secured to the felly, spaced apart and undercut blocks 12 on the felly being the cooperating elements for this purpose. The tube 2ª has a linear flange 13 apertured to receive a nutted bolt 14 by which the tube is connected with the spoke seat 1, the journal so formed having ball bearings 15. As before described, the shaft 8 has a circumferential enlargement 9, and this enlargement acts as a core for a relatively heavy coiled spring 20 spaced between the two tubes and bolted to the flanges of these tubes. The parts described are protected against dust by cover plates F which are removably fitted to the wheel, being shown as secured to the hub A.

The advantages of my improved wheel will be apparent. Let it be noted that by the arrangement of spring elements each spring of each spoke plays its part in absorbing the weight to which the wheel is subjected. The parts are simple in their assembly and do not require constant attention either for purposes of lubrication or of tightening parts, lubrication being readily effected by simply applying heavy grease on the larger spring 20 from which it will run into the other parts of the spoke as the wheel revolves.

I claim as my invention:

1. A resilient wheel including a hub and felly, and spokes, each of which comprises an inner and outer spaced apart tube, a spring bridging the space between said tubes, a shaft having a portion extending into each tube, a coiled spring between each end of the shaft and the inner end of the tube within which it is seated, and a second coiled spring within each tube and surrounding the end of the shaft therein, said second spring being seated on said shaft.

2. A resilient wheel including a hub and felly, and spokes, each of which comprises an inner and outer spaced apart tube, each of said tubes having laterally extending flanges, a spring bridging the space between said tubes and bolted to said flanges, a shaft having a portion extending into each tube, a coiled spring between each end of the shaft and the inner end of the tube within which it is seated, and a second coiled spring within each tube and surrounding the end of the shaft therein, said second spring being seated on said shaft.

3. A resilient wheel including a hub and felly, and spokes, each of which comprises an inner and outer spaced apart tube, said tubes having laterally extending flanges, and the inner tube having a pivotal connection with the hub, said outer tube having a rigid connection with the felly, a spring bridging the space between said tubes and bolted to the laterally extending flanges thereof, a shaft having a portion extending into each tube, a coiled spring between each end of the shaft and the inner end of the tube within which it is seated, and a second coiled spring within each tube and surrounding the end of the shaft therein, said second spring being seated on said shaft.

4. A resilient wheel including in combination with a hub having a series of radially projecting spoke seats and a felly provided with pairs of spaced apart and undercut blocks on the inner circumference, spokes each of which comprises an inner and outer spaced apart tube, a spring bridging the space between said tubes, a shaft having a portion extending into each tube, a coiled spring between each end of the shaft and the inner end of the tube within which it is seated, and a second coiled spring within each tube and surrounding the end of the shaft therein, said second spring being seated on said shaft, said inner tube having a pivotal connection with the spoke seats of said hub, and said outer tube having radially extending flanges adapted to fit within the undercut portion of the blocks on said felly.

5. A resilient wheel including a hub and felly, and spokes, each of which includes an inner and outer spaced apart tube, a spring bridging the space between said tubes, a shaft having a circumferentially enlarged portion and a portion extending into each tube, such circumferential enlarged portion forming a core for said spring, a coiled spring between each end of the shaft and the inner end of the tube within which it is seated, and a second coiled spring within each tube and surrounding the end of the shaft therein, said last mentioned spring being seated at one end adjacent the circumferentially enlarged portion of the shaft.

In testimony whereof I have signed this specification.

HENRY GRIFFOUL.